UNITED STATES PATENT OFFICE.

GEORG BREDIG, OF KARLSRUHE, GERMANY, ASSIGNOR TO THE FIRM OF RUDOLPH KOEPP & CO., OF OESTRICH-ON-THE-RHINE, GERMANY.

PRODUCTION OF FORMIC ACID.

1,235,426.  Specification of Letters Patent.  Patented July 31, 1917.

No Drawing.  Application filed July 21, 1915. Serial No. 41,169.

*To all whom it may concern:*

Be it known that I, GEORG BREDIG, a subject of the German Emperor, and resident of Karlsruhe, Badenia, Germany, have invented certain new and useful Improvements in the Production of Formic Acid, of which the following is a specification.

My invention relates to the production of formic acid.

In a prior application filed December 4th, 1914, Ser. No. 875466, I have described a process for producing formiates by treating bicarbonates or a mixture of carbonates and carbonic acid in the presence of a catalytic active substance and under high pressure with hydrogen, either alone or mixed with carbonic acid gas, the formiates thus obtained being converted into formic acid, if desired.

According to the present invention formic acid is obtained directly and without employing an alkali or a salt, the formic acid being obtained direct from carbon dioxid (carbonic acid) by reduction with ordinary hydrogen gas under high pressure and in the presence of catalytically active substances, such as a metal of the platinum group, and a solvent such as water.

In the practice of my invention I proceed for instance as follows:

150 ccm. of water and 3 g. palladium black are vigorously stirred in a closed vessel with a gas mixture consisting of say 64 per cent. hydrogen gas and 36 per cent. carbon dioxid gas, a pressure of 110 atmospheres being maintained within the vessel. According to the temperature which is below 100 degr. C., after some time a pure dilute solution of formic acid is obtained. If a temperature of 20 degr. C. had been maintained, this solution will contain about 1 per cent, formic acid. If a still higher pressure is applied, the output of formic acid will increase considerably. The solution obtained may be concentrated in any well known manner.

In general I prefer applying low temperatures and high pressure.

Instead of water, other suitable solvents such as athyl ether, alcohol, ethers, ketones, paraffin or liquid acids may be used.

I am aware that it has been proposed to reduce carbon oxids by aid of hydrogen gas under pressure and in the presence of catalysts, but it had not been possible to obtain in this way formic acid, much less in a dissolved state.

I claim:—

1. The process for producing formic acid which consists in subjecting a mixture of hydrogen and carbon dioxid to high pressure in the presence of a catalyst and of a solvent.

2. The process for producing formic acid which consists in subjecting a mixture of hydrogen, carbon dioxid, a catalyst and a solvent to high pressure.

3. The process for producing formic acid which consists in acting upon carbon dioxid with hydrogen in the presence of a catalyst comprising a metal of the platinum group and a solvent, high pressure being maintained in the reaction vessel.

4. The process for producing formic acid which consists in subjecting a mixture of hydrogen and carbon dioxid to high pressure in the presence of water and of a catalyst.

5. The process for producing formic acid which consists in subjecting a mixture of hydrogen and carbon dioxid to high pressure in the presence of water and of a catalyst comprising palladium.

In testimony whereof I have signed my name to this specification in the presence of two subscribing witnesses.

GEORG BREDIG.

Witnesses:
 FRIEDERICKA MACKAY,
 C. INNESS BROWN.